March 21, 1967 R. L. JAMES 3,310,726
SIGNAL CONVERTERS
Filed Aug. 19, 1964
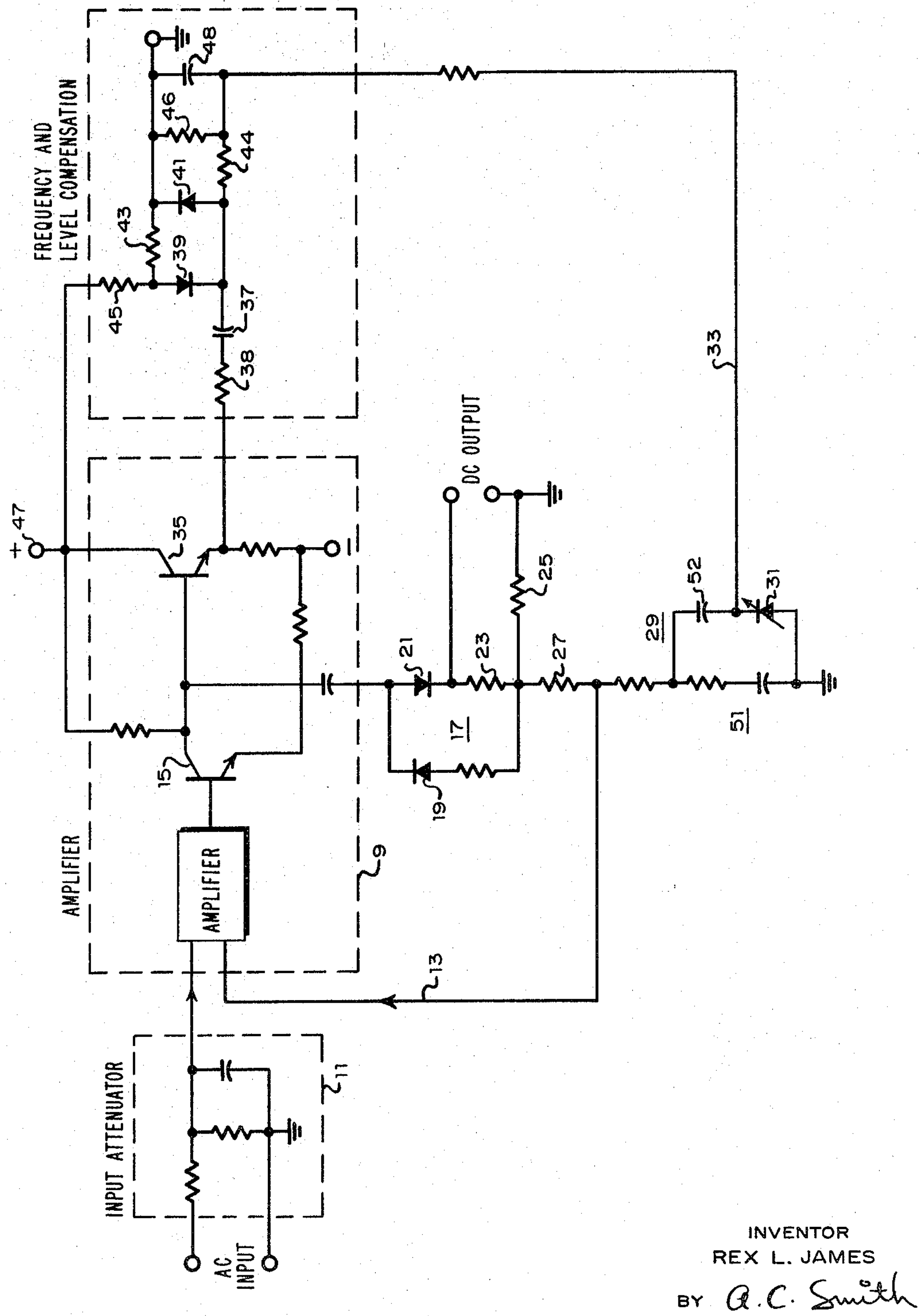
INVENTOR
REX L. JAMES
BY A. C. Smith
ATTORNEY

United States Patent Office 3,310,726
Patented Mar. 21, 1967

3,310,726

SIGNAL CONVERTERS

Rex L. James, Loveland, Colo., assignor to Hewlett-Packard Company, Palo Alto, Calif., a corporation of California Filed Aug. 19, 1964, Ser. No. 390,673
2 Claims. (Cl. 321—8)

This invention relates to an A.C. to D.C. converter which includes a circuit that compensates for nonlinearities introduced at high frequencies and low signal levels by diodes in the feedback circuit of the converter.

It is an object of the present invention to provide frequency and amplitude compensation in the feedback circuit of an A.C. to D.C. converter to improve the linearity of D.C. signal output for A.C. signal input over a wide range of frequencies and signal amplitudes.

It is another object of the present invention to use a voltage-variable reactance element in the feedback circuit of a signal converter to improve the linearity of input level to output level.

In accordance with the illustrated embodiment of the present invention, a bridge-type rectifier circuit is included in a feedback circuit around a differential amplifier to provide a D.C. output voltage proportional to an A.C. input voltage. This feedback signal is altered in response to the impedance of a varicap (voltage-controlled capacitor) which receives a signal related to the frequency and amplitude of signal at the output of the amplifier.

Other and incidental objects of the present invention will be apparent from a reading of this specification and an inspection of the accompanying drawing which shows a schematic diagram of the circuit of the present invention.

Referring now to the drawing, there is shown an amplifier 9 which receives the A.C. input signal through attenuator 11 and the feed back signal on line 13. A.C. signal from amplifier stage 15 is applied to the meter bridge 17 which includes diodes 19 and 21 connected to conduct alternate half cycles of A.C. signal. D.C. output voltage may be taken off the cathode electrode of diode 21. A.C. signal flows through the resistors in series with diodes 19 and 21 and through resistors 25 and 27 and network 29 to produce an A.C. feedback signal on line 13 which is applied to an input of the amplifier 9. High frequency compensation is provided by network 51 and capacitor 52 blocks the flow of D.C. bias signal for varicap 31.

The feedback ratio, $\beta$, in the circuit is altered slightly with frequency and signal level by the network 29 including varicap 31. This network shunts to ground a controllable portion of the A.C. feedback signal at higher frequencies where the capacity of diodes 19 and 21 tends to increase the signal feedback. The resulting compensated feedback thus maintains the overall gain from A.C. input to D.C. output substantially constant.

The amount by which the feedback ratio of the feedback circuit is altered is determined by the amplitude of the D.C. signal on line 33 applied to varicap 31. The low-impedance output stage 35 of amplifier 9 applies an A.C. output signal through lead network 37 to the diodes 39 and 41. Diode 41 clamps to ground the half cycles of one polarity of the A.C. signal and the network including resistors 44 and 46 and capacitor 48 filters the rectified signal to produce a D.C. signal on line 33 which is related to the A.C. signal level. Diode 39 is connected to clip the rectified half cycles at a voltage value which is determined by the combination of resistors 43 and 45 and the voltage at power supply terminal 47. This voltage value is selected at the level of bias for varicap 31 which provides the desired compensation in overall converter gain, and is typically 1.2 to 1.4 volts. The signal conductance of lead network 37 increases with frequency so that control of varicap 31 occurs predominantly at higher frequencies where the capacitance of diodes 19 and 21 operating at low levels in the high resistance region of the forward conduction characteristic has significant effect on the feedback signal. High frequency signals of high level are clipped by diode 39 so that no more control of varicap 31 is provided than is required to compensate for the nonlinearities of diodes 19 and 21 which occur in the low voltage forward conduction region. Capacitor 37 blocks the flow of D.C. bias signal and resistor 38 limits the load on amplifier stage 35. The conductance of this network decreases with frequency so that less controlling voltage is applied to varicap 31 at lower frequencies where the capacity of diodes 19 and 21 has negligible effect on the feedback signal.

Therefore the circuit of the present invention compensates for the effects at high frequencies of the capacity across the diodes included in a bridge circuit connected in the feedback circuit of an A.C. to D.C. converter which compensation varies in response to the level of the applied A.C. signal.

I claim:

1. A circuit for converting an applied A.C. signal to a D.C. signal of related amplitude, the circuit comprising:
   - an amplifier having an input and an output;
   - a pair of diodes, each connected to the output of said amplifier to conduct alternate half cycles of signal appearing at said output;
   - means connected to the input of said amplifier for applying thereto the combination of the applied A.C. signal and a feedback signal related to the half cycles of signal conducted alternately by said diodes;
   - a circuit including a signal variable impedance element connected to receive said feedback signal for altering the amplitude thereof in response to a control signal applied to said element;
   - circuit means connected to the output of said amplifier for producing a control signal having an amplitude related to the frequency and amplitude of signal at the output of said amplifier; and
   - a conductive connection between said circuit means and said element for applying said control signal thereto.

2. A circuit for converting an applied A.C. signal to a D.C. signal of related amplitude, the circuit comprising:
   - an amplifier having an input and an output;
   - a pair of diodes, each having in the forward conduction characteristic thereof a low value of forward voltage drop below which the diode shows high resistivity in the forward current conduction direction and each connected to the output of said amplifier to conduct alternate half cycles of signal appearing at said output;
   - means connected to the input of said amplifier for applying thereto the combination of the applied A.C. signal and a feedback signal related to the half cycles of signal conducted alternately by said diodes;

an attenuator circuit including a varicap connected to receive said feedback signal for altering the amplitude thereof in response to a control signal applied to said varicap;

circuit means connected to the output of said amplifier for producing a control signal having an amplitude related to the frequency of signal at the output of said amplifier;

a clipping circuit connected to receive said control signal for limiting the amplitude thereof to a value related to said low voltage value for the diodes; and a conductive connection between said circuit means and said varicap for applying said control signal thereto.

No references cited.

JOHN F. COUCH, *Primary Examiner.*

W. H. BEHA, *Assistant Examiner.*